United States Patent
Bastenhof

(10) Patent No.: US 9,956,510 B2
(45) Date of Patent: May 1, 2018

(54) FILTRATION SYSTEM AND METHOD FOR FILTERING A LIQUID

(71) Applicant: BASTENHOF CONSULTANCY B.V., Ede GLD (NL)

(72) Inventor: Dirk Bastenhof, Ede GLD (NL)

(73) Assignee: BASTENHOF CONSULTANCY B.V., Ede Gld (NL)

( * ) Notice: Subject to any disclaimer, the term of this patent is extended or adjusted under 35 U.S.C. 154(b) by 31 days.

(21) Appl. No.: 15/026,687

(22) PCT Filed: Sep. 30, 2014

(86) PCT No.: PCT/NL2014/050669
§ 371 (c)(1),
(2) Date: Apr. 1, 2016

(87) PCT Pub. No.: WO2015/050439
PCT Pub. Date: Apr. 9, 2015

(65) Prior Publication Data
US 2016/0236121 A1    Aug. 18, 2016

(30) Foreign Application Priority Data
Oct. 3, 2013 (NL) .................................. 2011545

(51) Int. Cl.
*B01D 33/11* (2006.01)
*B01D 33/82* (2006.01)
(Continued)

(52) U.S. Cl.
CPC .............. *B01D 33/50* (2013.01); *B01D 33/11* (2013.01); *B01D 33/76* (2013.01); *B01D 33/82* (2013.01)

(58) Field of Classification Search
None
See application file for complete search history.

(56) References Cited

U.S. PATENT DOCUMENTS

| 4,052,303 A | 10/1977 | Hultsch et al. |
| 4,929,355 A * | 5/1990 | Ragnegangrd ......... B01D 33/09 162/29 |

(Continued)

FOREIGN PATENT DOCUMENTS

| CA | 2 638 922 A1 | 3/2009 |
| DE | 20 201 1100 3127 U1 | 7/2011 |
| JP | 11 221 409 A | 8/1999 |

OTHER PUBLICATIONS

International Search Report, dated Jan. 9, 2015, from corresponding PCT application.

*Primary Examiner* — Robert James Popovics
(74) *Attorney, Agent, or Firm* — Young & Thompson

(57) ABSTRACT

A filtration system for filtering a liquid includes a drum filter (2) having a primary inlet (4) and a primary outlet (6) in a housing (8), and a rotatable drum screen (10) arranged in the housing. A back flush element (12) is arranged on one side of the drum filter for back flushing filtered particles from the drum screen, and a gutter element (14) is arranged on an opposite side of the drum screen for collecting filtered particles, wherein the gutter element is connected to a secondary outlet (16) in the housing. The filtration system is furthermore provided with a buffer reservoir (18) having a reservoir inlet (20) which is connected to the secondary outlet so as to be closable. The filtration system further includes compression elements (34) for controlling a gas pressure ($P_t$) in the housing of the drum filter and a gas pressure ($P_r$) in the buffer reservoir.

15 Claims, 2 Drawing Sheets

(51) Int. Cl.
*B01D 33/76* (2006.01)
*B01D 33/50* (2006.01)

(56) References Cited

U.S. PATENT DOCUMENTS

| | | | | |
|---|---|---|---|---|
| 5,464,542 A * | 11/1995 | Grienberger | ........... | B01D 29/15 210/393 |
| 5,565,110 A * | 10/1996 | Brady | .................. | B01D 33/073 100/121 |
| 5,759,397 A * | 6/1998 | Larsson | ............... | B01D 33/073 210/331 |
| 6,006,554 A * | 12/1999 | Gallagher | ................. | D21C 9/06 162/321 |
| 6,409,929 B2 * | 6/2002 | Bott | ..................... | B01D 33/073 210/177 |
| 6,906,227 B2 * | 6/2005 | Neumann | ................ | C07C 37/70 210/402 |
| 7,807,060 B2 * | 10/2010 | Schmid | .................. | B01D 33/04 210/391 |
| 8,281,936 B2 * | 10/2012 | Grace | .................. | B01D 33/073 210/402 |
| 8,518,273 B2 * | 8/2013 | Lownertz | ........... | D21C 11/0064 162/30.11 |
| 8,980,086 B2 * | 3/2015 | Vanier | ...................... | B03C 3/30 210/252 |
| 2003/0183570 A1 * | 10/2003 | Takarabe | ............. | B01D 24/007 210/267 |
| 2012/0152861 A1 * | 6/2012 | Vanier | ...................... | B03C 5/02 210/774 |
| 2016/0236121 A1 * | 8/2016 | Bastenhof | .............. | B01D 33/11 |

* cited by examiner

FILTRATION SYSTEM AND METHOD FOR FILTERING A LIQUID

FIELD OF THE INVENTION

The present invention relates to a filtration system for filtering a liquid, for example swimming water in a swimming pool, swimming pond, etc. In a further aspect, the invention relates to a method for filtering a liquid.

PRIOR ART

In treatment installations which use drum filters which are known per se for filtering a liquid, for example swimming water, the positioning, in particular the vertical position, of the drum filter depends very much on the liquid level of the liquid to be treated in the liquid circuit into which the drum filter has been incorporated. This dependency on the liquid level is caused, in particular, by the drum filter used, since part of the drum filter has to be situated above the liquid level. As a result thereof, the vertical position of the filtration system cannot be chosen freely. Known drum filters usually comprise a housing provided with a primary inlet, a primary outlet, and a rotatable drum screen arranged in the housing. In use, the liquid to be filtered, the influent, flows into the housing via the primary inlet and will subsequently flow through the drum screen. The filtered liquid, the effluent, then leaves the housing via the primary outlet. During the filtration process, (dirt) particles are deposited on the inside of the drum screen. These filtered-out particles can be removed from the drum screen via a continuous or intermittent cleaning procedure. To this end, the known drum filter comprises a drainage gutter arranged on the inside of the drum screen and a backflush element which is situated opposite, on the outside of the drum screen. During the cleaning procedure, the drum screen rotates and the backflush element flushes the filtered particles out of the drum screen by means of a flushing liquid and into the opposite drainage gutter, after which it is discharged by gravity flow (force of gravity) via a secondary outlet in the housing of the drum filter. This cleaning procedure requires the drainage gutter to be situated above the liquid level and thus to be arranged in a "dry" position in the housing, so that it can collect the polluted flushing liquid efficiently and discharge it using gravity flow.

A drawback of known drum filters is the fact that a large part of the drum screen has to be situated above the liquid level in the housing at all times. This limits the effective filtration surface area of the drum screen during filtration, for example to only 60% of the total filtration surface area of the drum screen. A further consequence thereof is the fact that a drum screen of a larger diameter and/or a longer drum screen has to be used at a certain filtration speed than would be the case if the drum screen could be used, for example, to 100%. Furthermore, when used in a water-treatment installation for swimming water, the drum filter will project greatly with respect to the water level of the water to be treated in the swimming pool, swimming pond and/or an intermediate basin in order to be able to function well. This can cause a nuisance for swimmers and the drum filter will often be difficult to reach for, for example, maintenance.

SUMMARY OF THE INVENTION

It is an object of the present invention to provide an improved filtration system comprising a drum filter for filtering a liquid in a liquid circuit, for example swimming water, wherein the filtration system can be positioned independently from the liquid level in the liquid circuit.

This object is achieved by providing a filtration system according to the invention, comprising a drum filter provided with a primary inlet and a primary outlet in a housing of the drum filter; a rotatable drum screen arranged in the housing; a backflush element arranged on one side of the drum screen for backflushing filtered particles from the drum screen; a gutter element arranged on an opposite side of the drum screen for collecting the filtered particles, wherein the gutter element is connected to a secondary outlet in the housing; characterized in that the filtration system is furthermore provided with a buffer reservoir comprising a reservoir inlet which is connected to the secondary outlet so as to be closable, and wherein the filtration system furthermore comprises compression means for controlling a gas pressure in the housing of the drum filter and a gas pressure in the buffer reservoir.

In contrast to known filtration systems comprising drum filters, the filtration system according to the invention makes it possible to position the drum filter below a (minimum) liquid level of the liquid circuit, as a result of which the drum filter housing can be filled completely with the liquid to be filtered during normal operation. In this case, the closable connection between the secondary outlet and the reservoir inlet is closed. Such a filling of the drum filter housing ensures that the drum filter is completely surrounded by the liquid and will, as such, have a maximum filtering capacity (as a result of using the maximum filtration surface area). This has the significant advantage that a smaller drum screen can be used.

Although the drum filter housing according to the invention, in one operating state, is virtually completely filled with liquid, conventional cleaning of the drum filter by means of the backflush and the gutter elements remains possible due to the compression means. These compression means can temporarily lower the liquid level in the housing by means of a gas pressure until the gutter element "surfaces" and is surrounded by gas (e.g. air), that is to say until the gutter element is situated above the liquid level in the housing. In fact, the compression means simulate a conventional arrangement of the drum filter.

In addition, the compression means control a gas pressure in the buffer reservoir in such a way that this gas pressure is equal to the gas pressure in the drum filter housing. Once the closable connection between the secondary outlet and the reservoir inlet is opened, conventional cleaning of the drum screen can take place. In a cleaning state of the filtration system, the flushing liquid collected by the gutter element flows to the buffer reservoir using gravity flow.

The surprising technical effect of the filtration system according to the invention is that, on the one hand, maximum use can be made of the drum screen in the operating state and, on the other hand, that conventional cleaning of the drum screen remains possible in the cleaning state, with filtering still also taking place, albeit using a slightly smaller filtration surface area. It should be noted here that, in the cleaning state, which is a temporary procedure, the filtration process can be continued, albeit with a slightly higher filtration speed.

Another surprising technical effect of the filtration system according to the invention occurs when the compression means temporarily lowers the liquid level in the housing. For example, filtered particles trapped by the drum screen, but not adhering thereto, tend to float on the surface of the liquid in the drum filter once the compression means lowers the liquid level in the housing. Because of the round or cylindrical shape of the drum screen, floating filtered particles tend to accumulate near the centre and a highest point within the confines of the drum screen when the liquid level drops. As a result, these floating particle are captured by the gutter element once it surfaces above the liquid level. In prior art systems such floating particles are not removed and remain behind in the drum filter, thus requiring additional cleaning intervention.

Various studies have shown that a drum filter as a pretreatment for, for example, a sand filter in a water-treatment installation can reduce the load on the sand filter by as much as 90%, which benefits the service life of the sand filter or makes it possible to reduce the capacity of the sand filter. The filtration system according to the invention can therefore be used as a pretreatment system for sand filters in an efficient manner.

In addition, the filtration system according to the invention can be used in known treatment installations for swimming water. Thus, the filtration system can be arranged between a return line of a swimming pool and a buffer cellar for collecting swimming water, thus efficiently minimizing soiling of the buffer cellar. Furthermore, the filtration system according to the invention will improve the quality of the swimming water, as the filtered particles (dirt) have less time to bond with e.g. chlorine in the swimming water, thus minimizing harmful chlorine bonds. Also, coarse dirt filters, usually referred to as hair catchers, are no longer necessary in the swimming water circuit when using the filtration system according to the invention, so that the usually laborious cleaning of the hair catchers is no longer necessary.

Since the housing of the drum filter will be under a liquid and/or gas pressure, both during the operating state and during the short cleaning state, in an advantageous embodiment, the housing is a gas-tight and liquid-tight closed housing, thus preventing any leakage.

In a further aspect, it is an object of the present invention to provide an improved method for filtering a liquid in a liquid circuit, for example swimming water, using a filtration system according to the invention, comprising:

a) positioning the drum filter below a level of the liquid in the liquid circuit in order to achieve a maximum liquid volume in the housing, wherein the secondary outlet is closed off from the reservoir inlet;

b) passing the liquid through the drum filter for filtering the liquid;

c) controlling a first gas pressure in the housing until the gutter element is completely surrounded by gas;

d) controlling a second gas pressure in the buffer reservoir until the second gas pressure is substantially equal to the first gas pressure in the housing;

e) simultaneously rotating the drum screen and cleaning the drum screen during a desired cleaning time, wherein cleaning comprises activating the backflush element for backflushing particles from the drum screen as far as the gutter element, and wherein the secondary outlet is in open communication with the reservoir inlet for discharging backflushed particles from the gutter element to the buffer reservoir;

f) at the end of the cleaning time, controlling the first gas pressure in the housing until the maximum liquid volume in the housing has been reached, wherein the secondary outlet is closed off from the reservoir inlet;

g) repeating the steps b) to f).

In an embodiment, the steps c) and d) can be carried out in sequence. In an alternative embodiment, the steps c) and d) can also be carried out simultaneously.

BRIEF DESCRIPTION OF THE FIGURES

The present invention will now be described in more detail by means of a number of exemplary embodiments and with reference to the attached drawings, in which.

DETAILED DESCRIPTION OF EXEMPLARY EMBODIMENTS

Figure 1:
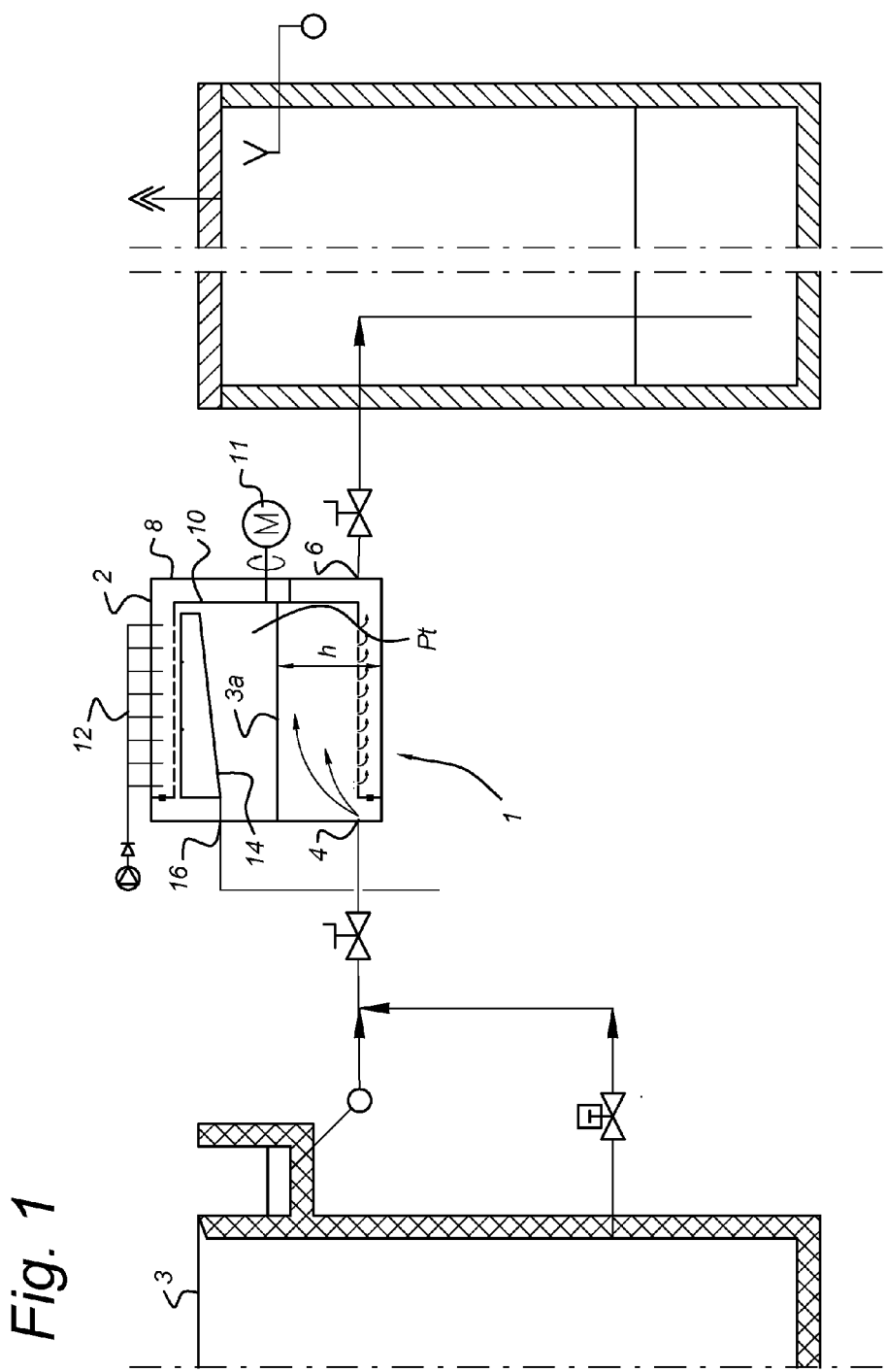
FIG. 1 shows a liquid circuit comprising a known filtration system for filtering a liquid.

FIG. 1 shows a liquid circuit comprising a known filtration system (1) for filtering a liquid 3, in particular swimming water 3. The known filtration system 1 comprises a drum filter 2 provided with a primary inlet 4 and a primary outlet 6 in a housing 8 of the drum filter 2. A rotatable, round or cylindrical drum screen 10 is arranged in the housing 8, with the drum screen 10 usually being driven by a driving unit (for example electric motor) 11. The drum screen 10 often comprises a woven "filter cloth", made of, for example, stainless steel or nylon, and having a mesh size of sometimes less than 20 μm which is arranged on a cylindrical basket which is closed on one side. The housing 8 is usually an atmospheric container which is open (or may be closable) and which is provided with a primary inlet (4) and a primary outlet (6). Often, the periphery of the drum screen 10 is provided with a sealing element which divides the housing 8 into a part which is in direct communication with an internal part of the drum screen 10 and with a part which is external to the drum screen 10. Furthermore, the drum filter 2 comprises a backflush element 12 arranged on the exterior of the drum filter 2 for backflushing particles from the drum screen (10). The backflush element 12 is often designed to have one or more spray nozzles, for example water spray nozzles, which are used to flush dirt particles back into a gutter element 14 which is arranged on the interior of the drum screen 10 by means of "water jets". The drum screen 10 may rotate intermittently or continuously during cleaning of the drum screen 10. Furthermore, the gutter element 14 is connected to a secondary outlet 16 in the housing 8, as a result of which the particles collected in the gutter element 14 can be discharged from the drum filter 2 using gravity flow, that is to say by means of gravity.

As is illustrated in FIG. 1, the known drum filter 2 has to be arranged in a "high" position, for example close to the liquid level 3 in a swimming pool, in order to make cleaning by means of the backflush and gutter elements 12, 14 possible. As a result thereof, the liquid level h in the housing 8 is usually lower than e.g. 60% of a diameter of the drum screen 10 during operation of the drum filter 2. In this situation, the housing 8 is thus not completely filled with the liquid 3, that is to say, there is no maximum liquid volume present in the housing 8 (the drum screen 10 is not "flooded"). The remaining volume in the housing 8 is filled by an ambient gas under atmospheric pressure ($P_t$), for example ambient air. Filtration of the liquid 3 takes place under the effect of the force of gravity, as a result of which a natural drop is created which causes the liquid 3 to be filtered to flow through the primary inlet 4, the drum screen 10 and primary outlet 6. The operation of the drum filter 2 thus inter alia depends on the vertical position of the drum filter 2 with respect to the liquid level 3.

A level-dependent position of the known drum filter 2 can cause problems, particularly in the treatment of swimming water, since a large number of other treatment apparatuses are often placed in a cellar adjacent to the swimming pool. Since known drum filters 2 have to be arranged in a "high" position (e.g. close to the water level in the swimming pool), cellars often have to be situated in a higher position, which is also detrimental in view of any maintenance operations.

Figure 2:
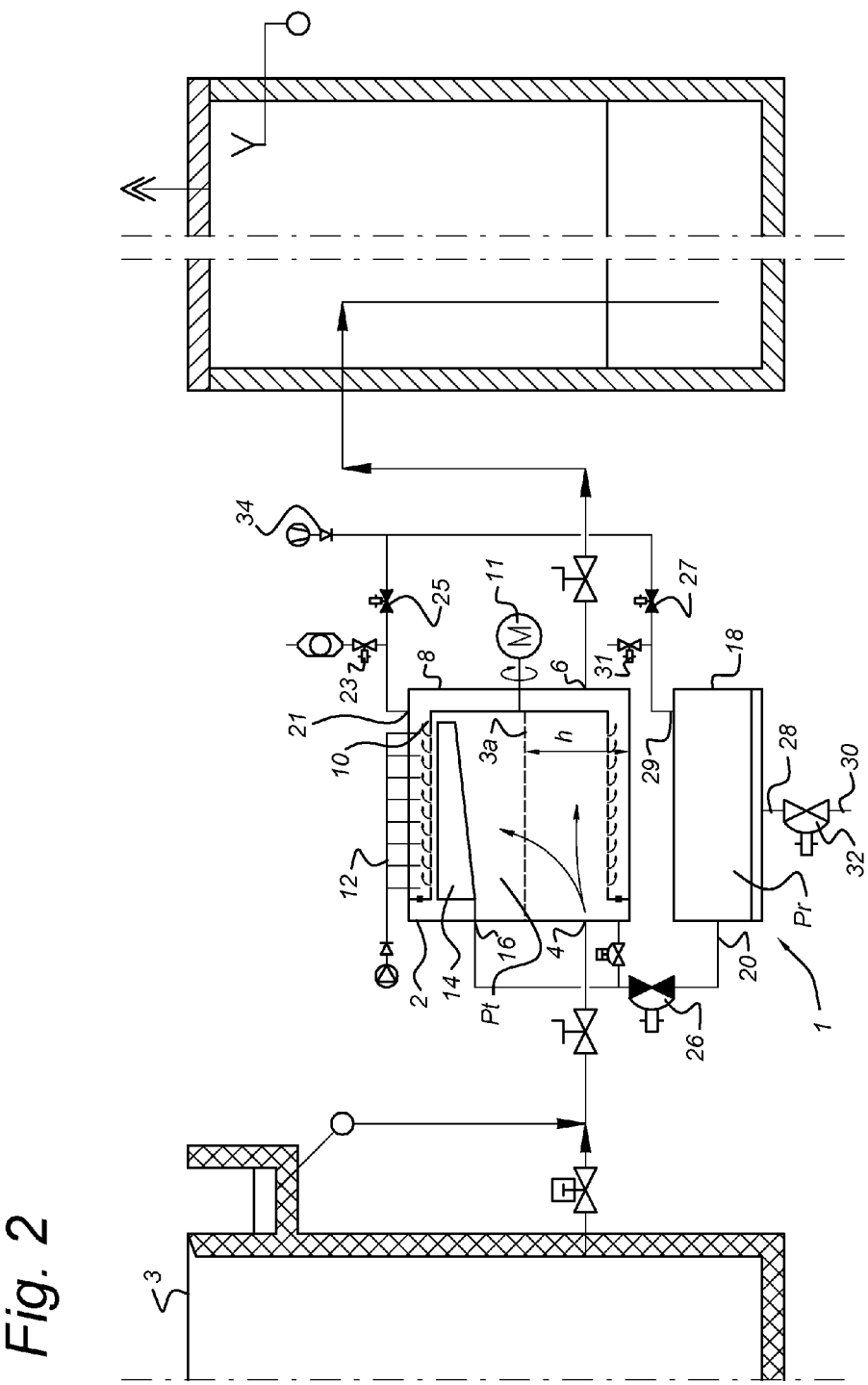
FIG. 2 shows a liquid circuit comprising a filtration system for filtering a liquid according to an embodiment of the present invention.

The abovementioned problems regarding the fact that the drum screen 10 is not being used to its full extent (<100%) and the level-dependent position of the drum filter 2 are solved by the embodiment of the filtration system 1 according to the invention illustrated in FIG. 2.

The filtration system 1 comprises a drum filter 2 provided, as described above, with a primary inlet 4 and a primary outlet 6 in a housing 8 of the drum filter 2. A rotatable, round or cylindrical drum screen 10 is arranged in the housing 8. In certain embodiments, the drum screen 10 may be driven by a driving unit (e.g. electric motor) 11. A backflush element 12 (e.g. a liquid spray nozzle) is arranged on one side of the drum filter 2 for backflushing filtered (dirt) particles out of the drum screen 10. In typical embodiments, the backflush element 12 will comprise manifolds for spraying a flushing liquid, e.g. water. Furthermore, a gutter element 14 is arranged on an opposite side of the drum screen 10 for collecting backflushed filtered (dirt) particles. The gutter element 14 is connected to a secondary outlet 16 in the housing 2 for discharging collected (dirt) particles.

According to the invention, the characteristic measure of the filtration system 1 is the fact that the filtration system 1 is furthermore provided with a buffer reservoir 18 comprising a reservoir inlet 20 which is connected to the secondary outlet 16 so as to be closable, and wherein the filtration system 1 comprises compression means 34 for controlling a gas pressure in the housing 8 of the drum filter 2 and a gas pressure in the buffer reservoir 18.

The surprising technical effect of this characteristic measure is that the entire drum filter 2 can be positioned (far) below the liquid level of a liquid 3 to be filtered in order to use the filtration capacity of the drum screen 10 completely in an operating state, while the conventional cleaning procedure by means of the backflush and gutter elements 12, 14 remains functional in a cleaning state of the drum filter 2. The compression means 34 make it possible to switch the filtration system 1 from an operating state to a cleaning state and vice versa.

In an operating state, the housing 8 is filled with the liquid 3 at a certain hydrostatic pressure due to the fact that the drum filter 2 has been positioned below a liquid level. In this situation, the drum screen 10 can be used to maximum effect for the filtration process, so that a smaller drum filter 2 can be used compared to the situation in which the drum filter is arranged in a "high" position, above the water level.

The compression means 34 make it possible to control the gas pressure in the housing 8 in order to lower the liquid level in the housing 8 until a liquid level 3a is reached which is below the gutter element 14 in the cleaning state. In the cleaning state, the gutter element 14 is in fact "exposed" and virtually completely surrounded by the gas supplied by the compression means 34. The lowered liquid level 3a in the cleaning state allows conventional cleaning of the drum filter 2. In other words, by means of the compression means 34, a conventional arrangement of the drum filter 2 in FIG. 1 in the cleaning state can be simulated, the only difference being that the housing 8 is under an elevated non-atmospheric gas pressure ($P_t$).

Lowering the liquid level in the housing 8 has another surprising technical effect in that filtered particles trapped by the drum screen 10, but not adhering thereto, tend to float on the surface of the liquid in the drum filter 2 once the compression means 34 lowers the liquid level in the housing 8 to the lowered liquid level 3a. Because of the round or cylindrical shape of the drum screen 10, floating particles tend to accumulate near the centre and a highest point within the confines of the drum screen 10 when the liquid level drops. As a result, the floating filtered particles are captured by the gutter element 14 when it surfaces above the liquid level.

Despite the lowered liquid level 3a in the housing 8, the filtration process may continue during the cleaning state, albeit at a slightly elevated filtration speed.

With known drum filters, liquid may leak when the housing 8 is filled completely with the liquid 3 to be filtered under a hydrostatic pressure. Furthermore, gas (harmful (chlorine) vapours) may leak if the housing 8 is subjected to an elevated gas pressure. This may (temporarily) be the case, for example if the amount of water supplied is greater than the amount removed. In an advantageous embodiment, the housing 8 is a gas-tight and liquid-tight closed housing, in particular an air-tight and watertight closed housing 8, so as to keep any gas or liquid leakage of the housing 8 to a minimum.

In an embodiment, the housing 8 may be made of stainless steel (RVS). In a further embodiment, that part of the housing 8 which extends above the liquid level 3a may be coated in order to prevent corrosion, for example if the liquid 3 is chlorine-containing water. In an alternative embodiment, the housing 8 may also be made of plastic in order to prevent problems with corrosion.

The compression means 34 furthermore make it possible to control a gas pressure in the buffer reservoir 18 and make it substantially equal to the gas pressure in the housing 8 in the cleaning state. Due to the fact that the filtration system 1 comprises a reservoir inlet 20 which is connected to the secondary outlet 16 so as to be closable, a closable connection between the housing 8 and the buffer reservoir 18 is created. In the operating state, this connection is closed, so that the housing 8 can be filled completely with the liquid 3 during the filtration process. By contrast, in the cleaning state, the closable connection between the housing 8 and the buffer reservoir 18 is open, so that it is possible to discharge the collected flushing liquid to the buffer reservoir 18 at equal pressure.

In the cleaning state, there is usually an excess pressure of gas in the housing 8 and the buffer reservoir 18 with respect to the surroundings of the filtration system 1. The excess pressure is then equal to the water pressure corresponding to the water column which has been displaced by the excess pressure (the degree of being "flooded").

In an embodiment, the buffer reservoir 18 is in a lower vertical position than the gutter element 14, so that the collected flushing liquid flows to the buffer reservoir 18 in the cleaning state on account of the force of gravity.

In an embodiment, the reservoir inlet 20 is connected to the secondary outlet 16 so as to be closable by means of a first discharge valve 26, for example an automatic discharge valve 26 which makes it possible to effect automated control of the closable connection between the secondary outlet 16 and the reservoir inlet 20.

In a compact embodiment, the compression means 34 are integrated in the filtration system 1, for example a locally arranged gas compressor 34 which controls the pressure in the housing 8 and the buffer reservoir 18. In an alternative embodiment, the compression means 34 form part of an externally arranged gas compressor 34 which may also supply gases to other apparatuses of the liquid circuit to which the filtration system 1 is connected. In a typical embodiment, the compression means 34 supply air, for example ambient air.

In an embodiment, the buffer reservoir 18 is provided with a reservoir outlet 28 which is connected to a reservoir discharge 30 so as to be closable, so that buffered flushing liquid can be discharged in a controlled manner via, for example, a sewer. In a further embodiment, the reservoir outlet 28 is connected to the reservoir discharge 30 by means of a second discharge valve 32 so as to be closable, for example an automatic discharge valve 32 which makes automatic control of the closable connection between the reservoir outlet 28 and the reservoir discharge 30 possible.

It has already been mentioned above that the compression means 34 of the present invention make it possible to apply a gas pressure to the housing 8 during the cleaning state, as a result of which the conventional cleaning procedure of the drum screen 10 can be executed. In addition, the invention makes it possible to use the drum screen 10 to maximum effect by filling the housing 8 virtually completely with the liquid 3 to be filtered in the operating state. In other words, virtually completely filling the housing 8 with the liquid 3 to be filtered has the technical effect that the drum screen 10 is completely submerged in the liquid 3 in this situation. As a result thereof, the use of the drum screen 10, or in each case an effective filtration portion thereof, is maximized in the operating state. In a specific embodiment, it is furthermore possible that the housing 8 is not filled completely with the liquid 3 to be filtered, but that the drum screen 10 is still completely submerged in the liquid 3. In this embodiment, the use of the drum screen 10, or in each case an effective filtration portion thereof, is also maximized in the operating state.

Using the entire drum screen 10 has the advantage that a smaller drum filter 2 can be used than is customary. A smaller drum filter 2 also results in a lowering of the power consumption.

In an embodiment of the filtration system 1, the housing 8 comprises a first gas connection 21 which is connected to the compression means 34 so as to be closable by means of a first gas valve 25 which is arranged between the housing 8 and the compression means 34. By means of this gas valve 25, it is possible to change the gas pressure in the housing 8. The first gas valve 25 can open and close the connection between the gas connection 21 and the compression means 34. In advantageous embodiments, the first gas valve 25 may be an automatic gas valve 25 which makes automatic control of the gas pressure in the housing 8 possible.

In a further embodiment of the filtration system 1, the buffer reservoir 18 comprises a second gas connection 29 which is connected to the compression means 34 so as to be closable by means of a second gas valve 27 arranged between the buffer reservoir 18 and the compression means 34. The second gas valve 27 can open and close the connection between the second gas connection 29 and the compression means 34. In advantageous embodiments, the second gas valve 27 may be an automatic gas valve 27 which makes automatic control of the gas pressure in the buffer reservoir 18 possible.

In specific embodiments, the compression means 34 according to the present invention may vent the housing 8 and the buffer reservoir 18 of the filtration system 1, as a result of which the pressurized gas present in the housing 8 and/or the buffer reservoir 18 can be transported away via the compression means 34. This means, for example, for the housing 8 that the gas pressure will drop and the liquid level 3a in the housing 8 will rise, until the housing 8 is filled virtually entirely with the liquid 3 to be filtered.

In advantageous embodiments, a venting function of the housing 8 and/or the buffer reservoir 18 may also be provided by means of gas vents 23, 31. According to the invention, the filtration system 1 may comprise a closable first gas vent 23 which is connected to the housing 8 for controlling a gas pressure in the housing 8. In an embodiment, the gas vent 23 is arranged directly on the housing 8 by means of a dedicated connection to the housing 8. In an alternative embodiment, the first gas vent 23 is arranged downstream from a first gas valve 25 arranged between the housing 8 and the compression means 34. In this case, downstream is to be interpreted as the direction of gas supplied from the compression means 34 to the housing 8. In this embodiment, the first gas vent 23 is arranged between the first gas connection 21 and the first gas valve 25.

In addition, the filtration system 1 according to the invention may comprise a closable second gas vent 31 which is connected to the buffer reservoir 18 for controlling a gas pressure in the buffer reservoir 18. In an embodiment, the gas vent 31 is connected directly to the buffer reservoir 18 by means of a dedicated connection to the buffer reservoir 18. In an alternative embodiment, the second gas vent 31 is arranged downstream of a second gas valve 27 which is arranged between the buffer reservoir 18 and the compression means 34. In this case, downstream is to be understood as the direction of supplied gas from the compression means 34 to the buffer reservoir 18. In this embodiment, the second gas vent 31 is arranged between the second gas connection 29 and the second gas valve 27.

According to the present invention, it is desirable for the filtration capacity of the drum screen 10 to remain as high as possible during the cleaning state. This object is achieved by maximizing the liquid level 3a having a height h with respect to the housing 8 while exposing the gutter element 14. In an embodiment, the gutter element 14 is to this end arranged at the highest possible vertical position with respect to the drum screen 10. By placing the gutter element 14 in as high a position as possible with respect to the drum screen 10, a maximum liquid level 3a is achieved at which the gutter element 14 is still above the liquid level 3a. As a result thereof, a possible increase in the filtration speed due to the lower liquid level 3a can remain moderate and as much as possible filtration surface area of the drum screen remains available for filtration.

In a further embodiment of the filtration system 1, the primary inlet 4 and the primary outlet 6 are arranged in a bottom half of the housing 8. As a result of such a position of the primary inlet and outlet 4, 6, there is sufficient pressure available at the primary inlet 4 and primary outlet 6 during the filtration process in the operating state or cleaning state.

In a further aspect, the invention relates to a method for filtering a liquid 3 in a liquid circuit, for example swimming water, using a filtration system 1 according to the invention, comprising:

a) positioning the drum filter 2 below a (vertical) level of the liquid 3 in the liquid circuit in order to achieve a maximum liquid volume in the housing 8, wherein the secondary outlet 16 is closed off from the reservoir inlet 20.

This step clearly deviates from the known application of the drum filter 2, as the drum filter 2 is now positioned to be completely below the vertical level of the liquid 3, for example below the water surface of a swimming pool. With this step, the drum screen 10 will therefore be completely submerged in the liquid 3 to be filtered 3. In this case, the secondary outlet 16 is closed off from the reservoir inlet 20 in order to prevent liquid 3 from flowing from the drum filter 2 to the buffer reservoir 18.

The method of the present invention furthermore comprises:

b) passing the liquid through the drum filter (2) for filtering the liquid 3.

Since the drum screen 10 is completely surrounded by the liquid 3 in this step, the drum screen 10 will be used in its entirety when the liquid 3 is being passed through the drum filter 2. In an embodiment, the force of gravity will cause the liquid 3 to be passed through. Of course, the liquid 3 may also be actively passed through the drum filter 2, for example by using a pump installation which is suitable for the purpose. Step b) defines the operating state as described for the filtration system 1.

According to the invention, the method furthermore comprises:

c) controlling a first gas pressure ($P_t$) in the housing 8 until the gutter element 14 is completely surrounded by gas.

In this step, the liquid level 3a in the housing 8 will drop to a height h, in which the gutter element 14 is situated above the liquid level 3a. In other words, step c) may also be defined as controlling a first gas pressure in the housing 8 until the gutter element 14 is situated above the liquid level 3a.

The method furthermore comprises:

d) controlling a second gas pressure ($P_r$) in the buffer reservoir 18 until the second gas pressure is substantially equal to the first gas pressure in the housing 8.

In this step, the buffer reservoir 18 is prepared for collecting flushing liquid containing filtered (dirt) particles.

The method furthermore comprises:

e) simultaneously rotating the drum screen 10 and cleaning the drum screen 10 during a desired cleaning time, wherein cleaning comprises activating the backflush element 12 for backflushing particles from the drum screen 10 as far as the gutter element 14, and wherein the secondary outlet 16 is in open communication with the reservoir inlet (20) for discharging backflushed particles from the gutter element (14) to the buffer reservoir (18).

This step defines a cleaning state as described for the filtration system 1. Due to the fact that, in step d), the buffer reservoir 18 has a gas pressure which is virtually equal to that in the housing 8, the secondary outlet 16 can be brought into open communication with the reservoir inlet 20. The cleaning procedure then proceeds in a conventional manner, with the drum screen being rotated and cleaned by means of the backflush element 12. The gutter element 14 collects backflushed particles and the flushing liquid containing filtered particles flows to the buffer reservoir 18 by gravity flow. The cleaning time can be determined as a function of the level of dirt in the liquid, filter capacity etcetera.

The method further comprises:

f) at the end of the cleaning time, controlling the first gas pressure in the housing 8 until the maximum liquid volume in the housing 8 has been reached, in which case the secondary outlet 16 is closed off from the reservoir inlet 20.

After the cleaning in step e) has finished, that is to say at the end of the cleaning time, the gas pressure in the housing 8 can be controlled (lowered) until the housing 8 is again filled to capacity with liquid 3. In this case, the secondary outlet 16 is closed off from the reservoir inlet 20 in order to prevent liquid flowing from the housing 8 to the buffer reservoir 18.

Steps b) to f) define an intermittent filtration process, in which the operating state is interrupted for a certain period of time by a cleaning state. It should be noted that filtration still takes place in the cleaning state, but that the drum screen 10 is not used in an optimum manner.

In order to be able to alternate between the operating state and cleaning state, the method according to the invention also comprises:

g) repeating the steps b) to f).

In an embodiment of the method, the steps c) and d) can be carried out in sequence. In an alternative embodiment, the steps c) and d) can be carried out simultaneously/in parallel.

If the filtration system 1 and the method according to the present invention are used, for example, in a treatment installation for swimming water, the percentage of swimming water 3 used as flushing water by the backflush element 12 will be below 0.05%, which is very advantageous for the filtration process.

The present invention has been described above by means of a number of exemplary embodiments. To those skilled in the art, it will be clear that alternatives and modifications of parts of the embodiments are possible and that these fall within the scope of protection of the attached claims.

The invention claimed is:

1. A filtration system for filtering a liquid, comprising:
a drum filter provided with a primary inlet and a primary outlet in a housing of the drum filter;
a rotatable drum screen arranged in the housing;
a backflush element arranged on one side of the drum filter for backflushing filtered particles from the drum screen;
a gutter element arranged on an opposite side of the drum screen for collecting the filtered particles, wherein the gutter element is connected to a secondary outlet in the housing; wherein
the filtration system is furthermore provided with a buffer reservoir comprising a reservoir inlet which is connected to the secondary outlet so as to be closable, and wherein the filtration system furthermore comprises compression means for controlling a gas pressure in the housing of the drum filter and a gas pressure in the buffer reservoir.

2. The filtration system according to claim 1, wherein the housing is a gas-tight and liquid-tight closed housing.

3. The filtration system according to claim 1, wherein the buffer reservoir has a lower vertical position than the gutter element.

4. The filtration system according to claim 1, wherein the reservoir inlet is connected to the secondary outlet so as to be closable by means of a first discharge valve.

5. The filtration system according to claim 1, wherein the buffer reservoir is furthermore provided with a reservoir outlet which is connected to a reservoir discharge so as to be closable.

6. The filtration system according to claim 5, wherein the reservoir outlet is connected to a reservoir discharge 30 so as to be closable by means of a second discharge valve.

7. The filtration system according to claim 1, wherein the housing comprises a first gas connection which is connected to the compression means so as to be closable by a first gas valve arranged between the housing and the compression means.

8. The filtration system according to claim 1, wherein the buffer reservoir comprises a second gas connection which is connected to the compression means so as to be closable by a second gas valve arranged between the buffer reservoir and the compression means.

9. The filtration system according to claim 1, wherein the filtration system comprises a closable first gas vent which is connected to the housing for controlling a gas pressure in the housing.

10. The filtration system according to claim 9, wherein the first gas vent is arranged downstream of a first gas valve arranged between the housing and the compression means.

11. The filtration system according to claim 1, wherein the filtration system comprises a closable second gas vent connected to the buffer reservoir for controlling a gas pressure in the buffer reservoir.

12. The filtration system according to claim 11, wherein the second gas vent is arranged downstream of a second gas valve arranged between the buffer reservoir and the compression means.

13. The filtration system according to claim 1, wherein the gutter element is arranged at the highest possible vertical position with respect to the drum screen.

14. The filtration system according to claim 1, wherein the primary inlet and the primary outlet are arranged in a bottom half of the housing.

15. A method for filtering a liquid in a liquid circuit, using a filtration system according to claim 1, comprising:
   a) positioning the drum filter below a level of the liquid in the liquid circuit in order to achieve a maximum liquid volume in the housing, wherein the secondary outlet is closed off from the reservoir inlet;
   b) passing the liquid through the drum filter for filtering the liquid;
   c) controlling a first gas pressure in the housing until the gutter element is completely surrounded by gas;
   d) controlling a second gas pressure in the buffer reservoir until the second gas pressure is substantially equal to the first gas pressure in the housing;
   e) simultaneously rotating the drum screen and cleaning the drum screen during a desired cleaning time, wherein cleaning comprises activating the backflush element for backflushing particles from the drum screen as far as the gutter element, and wherein
   the secondary outlet is in open communication with the reservoir inlet for discharging backflushed particles from the gutter element to the buffer reservoir;
   f) at the end of the cleaning time, controlling the first gas pressure in the housing until the maximum liquid volume in the housing has been reached, wherein the secondary outlet is closed off from the reservoir inlet;
   g) repeating the steps b) to f).

* * * * *